May 1, 1951 — J. KREITNER — 2,551,440
COMPUTING APPARATUS
Filed Nov. 30, 1948 — 2 Sheets-Sheet 1

INVENTOR.
JOHN KREITNER
BY
Bertram Ottinger
ATTORNEY

May 1, 1951  J. KREITNER  2,551,440
COMPUTING APPARATUS

Filed Nov. 30, 1948  2 Sheets-Sheet 2

INVENTOR.
JOHN KREITNER
BY
Bertram Ottinger
ATTORNEY

Patented May 1, 1951

2,551,440

UNITED STATES PATENT OFFICE 2,551,440

COMPUTING APPARATUS

John Kreitner, New York, N. Y.

Application November 30, 1948, Serial No. 62,650

11 Claims. (Cl. 235—61)

1

This invention relates to computing apparatuses. In particular, my invention pertains to mechanical devices which are specially adapted to compute the values of one or more dependent variables which are a function of two or more independent variables of similar character.

Computations of this type are required, for example, in determining the weight total and its combined center of gravity for any distribution of weights among given locations, such as compartments of ships or airplanes, where exact knowledge and proper adjustment of the longitudinal center of gravity of the entire vehicle is of primary importance for maintaining proper trim and flight stability, respectively.

Algebraically, this type of computation comprises the forming of the total sum $\Sigma W_i$ of all component weights $W_i$ to obtain the weight total, then the summation of all their moments $\Sigma(a_i W_i)$, $a_i$ being their distances from an arbitrary point of reference, and finally dividing the second sum by the first to obtain the distance of the combined center of gravity from said reference point.

There are devices known in the art which perform such computations mechanically. But they are very complex and consist of a great number of parts.

It is an object of this invention to obtain a mechanical computation of the above type in a device of utter simplicity, comprising remarkably few structural elements, which consequently is more reliable, more durable, less expensive, and lighter than previous computers.

It is another object of my invention to provide a computing apparatus which includes in part a device of the character described.

According to one principal feature of my invention, the foregoing device comprises a core member, preferably of elongated shape, held in floating suspension between the inner ends of a plurality of substantially parallel, transversely spaced helical springs or other resilient elements whose outer ends are variably positioned according to the values of a plurality of independent variables (such as load items in vehicles), each variable corresponding to one spring. Thereby any change in the values of a set of independent variables produces a change in the equilibrium position of the elongated core member which, as will be shown hereinafter, is a definite measure of the changes of the weight total and of the moment total, $\Sigma W_i$ and $\Sigma(a_i W_i)$ respectively, produced by the combined variation of all independent variables $W_i$. Suitable means, according to the particular embodiment of the invention in which the device is employed, is included to indicate the corresponding values of the dependent variables which are related to $\Sigma W_i$ and $\Sigma(a_i W_i)$.

According to another feature of my invention, a spring-suspended core member such as described is employed in association with an alignment nomogram to ascertain the values of the dependent variables.

According to a further feature of my invention, the aforesaid spring-suspended core member has a point thereon selected which traces out substantially congruent curves matching a mechanically defined curve which is movable with a reading member. This arrangement permits the positional computation of the floating core member to be utilized in a more complex calculation.

An ancillary feature of my invention is concerned with the use of a core member floatingly supported in any manner whatsoever so as to have a point thereon trace out substantially congruent curves under the influence of changing independent variables, these curves being matched to a mechanically defined curve which is movable with a reading member, thus enabling complex calculations to be carried out in a simple mechanical fashion.

Other objects of my invention will in part be obvious and in part will be pointed out hereinafter.

My invention accordingly consists in the features of construction, combinations of elements and arrangements of parts which will be exemplified in the constructions hereinafter described, and of which the scope of application will be indicated in the appended claims.

In the accompanying drawings, in which are shown various possible embodiments of my invention, Fig. 1 is a schematic view of a ship's trim gauge embodying my invention;

Figure 1:
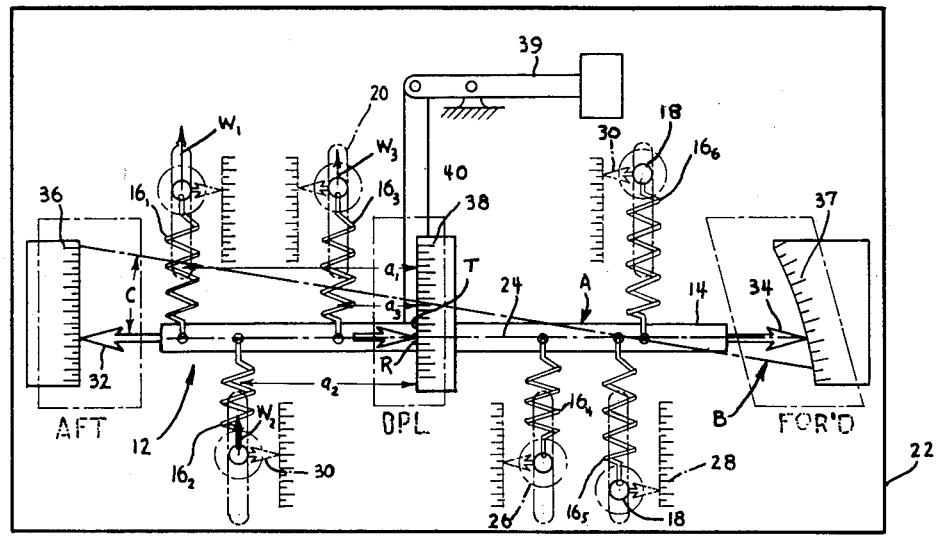

Referring now in detail to the drawings, and more particularly to Fig. 1, the reference numeral 10 denotes a computing apparatus including a parallel multispring system 12 constructed in accordance with the principal feature of my invention. Said system includes a substantially linear core member 14 to which the inner end of each of a plurality of helical springs $16_1$, $16_2$, $16_3$ ... $16_i$ are attached at transversely spaced intervals. Each spring has its outer end attached to a different post 18. Said posts are slidable perpendicular to the longitudinal axis of the core member in slots 20 formed in a supporting casing 22. The distances between the slots are equal to the distances between the points of attachment of the springs to the core member so that all the springs are substantially parallel to one another. It may be mentioned at this point that during operation of the system the springs may deviate slightly from strict parallelism, the maximum deviation approximating 4°. In accordance with my invention this is to be considered as maintenance of substantial parallelism. Desirably, the points of attachment of the springs to the core member lie on a straight line indicated by the dot-and-dash line 24.

The posts are provided with suitable means, as for example screw heads 26, to enable them to be set in any given positions in the slots and thus vary the positions of the outer ends of the springs. In order to set said center spring ends to correspond to given values, the casing and posts are provided with suitable scales 28 (e. g. on the casing alongside the slots 20) and index markers 30 (e. g. carried by the posts.) The springs all may be of the same type, e. g. tension, in which event they are located on opposite sides of the core member, as shown, in order to obtain equilibrium. Alternatively, all the springs may be disposed on the same side of the core member and in that case both tension and compression springs are used.

The geometry of the variation in equilibrium experienced by the core member upon changing the stress values of the several springs is coordinated to one or more dependent variable scales laid out according to the art of alignment nomography. Said dependent variables, to be read as results of the computation, may, according to the problems involved, be the displacement of a ship, its longitudinal center of buoyancy, and the drafts fore and aft, or, in an airplane, the flight weight and/or its longitudinal center of gravity relative to the mean aerodynamic chord of the wings.

An alignment nomogram is a geometric figure wherein a value of the dependent variable is determined by the intersection of a scale and a reading line having two degrees of freedom so that the point of intersection is a common point for an infinite number of positions of the reading line.

In conventional alignment charts the index line is drawn through two points on two different scales determined by the values of the independent variables. However, in devices embodying the feature of my invention now being described, the index line is affixed to the spring-suspended core member 14. Thereby any number of variables may be accommodated by a corresponding number of springs, provided that their individual influence is of the type similar to spaced component weights.

More specifically, the device 10 combines an alignment chart with a mechanical means for self-positioning the index line, i. e. the device 10 is a nomogram in which the scale bearers for the independent variables have been replaced by spring-setting mechanical input means, and the index line is affixed to a member suspended between said springs and positioned by the equilibrium of their forces.

The index line of the device 10 constitutes the pointers 32, 34 which are in alignment and for convenience are registered with the line 24 on which the inner ends of the springs are connected to the core member. It is to be observed, however, that more than two pointers may be employed and that the pointers may be offset angularly or transversely to the line 24.

The pointers sweep past scale bearers 36, 37 graduated for the dependent variables (in the instance the draft forward and the draft aft), the position of the scale bearers and the arrangement of their graduations being determined by the following factors:

The springs $16_1$, $16_2$, $16_3$ ... have elastic rates $K_1$, $K_2$, $K_3$ ... (generally $K_i$). Said springs are spaced at distances $a_1$, $a_2$, $a_3$ ... (generally $a_i$) from a reference point R on the line 24, distances to the left counting positive. The respective strokes of the various outer spring ends in the direction of the longitudinal axes of the springs and which are set by the movable input means (the screw heads 26) in any arbitrary linear units, are denoted by $W_1$, $W_2$, $W_3$ ... (generally $W_i$), upward counting positive.

The position A of the core member corresponds to a spring setting as shown. After applying the strokes $W_1$, $W_2$, $W_3$ ... $W_i$, the core member takes the equilibrium position B. The change in position may be expressed by the travel T of the reference point R and the angular change C. The expressions involved become particularly simple if the reference point R is so selected that the sum $\Sigma(K_i a_i)$, taken over all springs, becomes zero; in other words, if the reference point R is the center of gravity of all spring attachment points, each spring being taken with the weight of its elastic rate. Then the travel of the index line is determined by:

$$T = \frac{\Sigma(K_i W_i)}{\Sigma(K_i)} \qquad (1)$$

$$C = \frac{\Sigma(K_i a_i W_i)}{\Sigma(K_i a_i^2)} \qquad (2)$$

and $$y = T + Cx \qquad (3)$$

The third expression is the equation of the line 24, or pointers, in the new position of equilibrium B, relative to the position of equilibrium A before the input settings $W_i$ have been applied, $y$ being measured in the direction and in the units of $W_i$ and $x$ being measured in the direction and in the units of $a_i$. It is obvious that for a given device the quantities appearing in the denominator in the above equations are structural constants, the only variables being the inputs $W_i$.

With respect to Equation 3, any function which can be brought into such form, can be computed in the device 10 if the spring rates $K_i$ and the spring spacing $a_i$ are properly selected to suit the parameters of the given function and the required ranges of the variables. As an example, the combined effect of component weights can be computed by spacing the springs in the same proportion as the weight locations are spaced.

In a more general form, the vertical offsets $y$ may be expressed by the formula $$y = \Sigma(m_i W_i) \qquad (4)$$

wherein $$m_i = \frac{k_i}{\Sigma(k_i)} + \frac{k_i.a_i.x}{(K_i.a_i^2)} \quad (5)$$

The factors $m_i$ are on the one hand structural quantities comprising the spring rates ($k_i$), the location of the respective scale point ($x$ and $y$); on the other hand they are the given factors of the relation (4) to be computed. Formula 5 is the key for matching the structure to the problem.

$k_i$ and $a_i$ are constants for one computer structure. If also the given factors of the problem ($m_i$) are constants, $x$ results as constant, independent of $y$. In other words, the $y$-scale is a straight line parallel to the springs. If, however, the given factors ($m_i$) are in turn functions of $y$, as they well may be, $x$ results as a function of $y$. In other words, the $y$-scale is non-parallel to the springs and, generally, curved. In such derivation of a general $y$-scale the design of the computer coincides with nomographic method, in particular with the theory of alignment nomograms.

A very wide class of relationships can be expressed by $y = \Sigma(m_i.W_i)$ wherein $m_i = f_i(y)$, since the described structure imposes no limitation on the type of functions $f_i$. They may not even represent algebraic functions at all, but be given graphically or by tabulation.

For example, $y$ may represent the draft at any selected point of a ship (for, aft or midship), and $W_i$ the loads in the various longitudinal stations. Then the downwardly tapering ship form makes the $m_i$ functions of the draft, to be derived from the "hydrostatic curves" of the respective hull form. The draft scale $y$ will generally be slanting and curved.

In another example, $y$ may stand for the elastic deflection at a selected point of a bridge under loads $W_i$ at different stations. In this case, the $m_i$ are strictly constants, to be derived from the so-called "influence factors" of the bridge structure. The deflection scale $y$ will then be a straight line parallel to the springs.

An essential feature of the described computer consists in the possibility of matching its structure simultaneously to a plurality of equations (4) for several dependent variables $y_1$, $y_2$, etc. Thus, such a computer may for example simultaneously indicate, on several scales, the draft foreward, the draft aft, the mean draft and the displacement of a ship in accordance with its longitudinal load distribution.

Another dependent variable, the ship's displacement, may be read on a scale 38 alongside a slot on the casing, against a reading mark at the point R.

To enable the computer to be used in any position, a counterpoise lever 39, pivoted to the casing, is hinged to a link 40 which in turn is pivoted to the core number 14.

Figure 2:
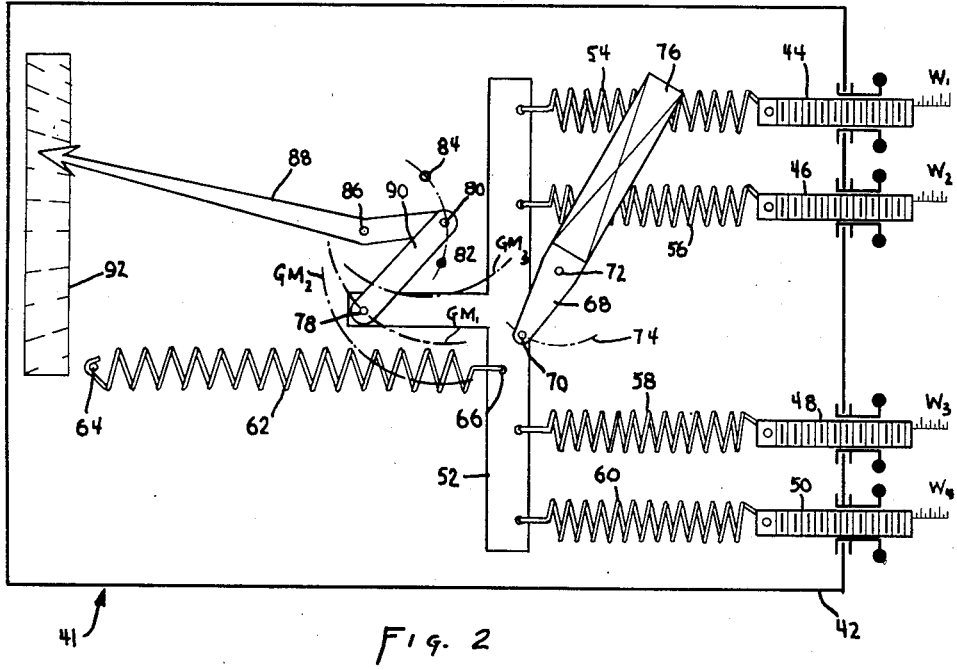
Fig. 2 is a similar view of a metacentric height computer embodying a modified form of my invention.

Fig. 2 shows a parallel multi spring computing device embodied in a computer 41 for determining the metacentric height of a ship as the function of the distribution of the load among the ship's decks. Said computer comprises a housing 42 in which actuators 44, 46, 48 and 50 are spatially arranged to correspond to the distribution of the decks in a ship, and the setting of each actuator, which may be of the micrometer thimble type, represents the load in the corresponding deck. The exposed portions of the micrometer barrels carry scale readable against the outer end of the micrometer sleeves. The actuators are connected to a core member 52 by helical springs 54, 56, 58 and 60. A counter-spring 62 is attached to the housing at 64 and to the core member at 66 so that the core member is suspended between the actuator springs and the counter-spring.

The counter-spring may be eliminated if the actuator springs are arranged to suspend the core member between them, for instance, by making the springs 56, 58 tension springs and the springs 54, 60 compression springs.

The core member 52 is guided by an arm 68 hingedly connected to the housing at 70 and to the core member at 72, so that this latter point is guided along the circular path 74. Also, the arm 68 carries a counter-weight 76 for balancing the weight of the core member and half the weight of the springs.

As thus far described, setting the weight of each deck into the springs 54, 56, 58, 60 by means of the actuators 44, 46, 48, 50, will cause the core member to assume a position which corresponds to the value of the loaded ship's center of gravity. The center of gravity is one of the intermediate values which must be ascertained in calculating the metacentric height, the latter being equal to the metacenter position above the keel minus the position of the center of gravity with respect to the keel. These last two calculations are carried out with the aid of the following additional structural parts:

A point 78 on the core member is selected. In the given function interrelating the independent and dependent variables, a constant value of the dependent variable is assumed, preferably about in the middle of the required range of the dependent variable, and the corresponding correlation of the independent variables is established. In the particular computer being described the controlling equation is:

$$GM = KM - KG$$

where GM is the metacentric height; KM is the height of the metacenter position above the keel; and KG is the height of the loaded ship's center of gravity above the keel. KM for a given ship is a function of the displacement, being ascertained from a graph or the ship's hydrostatic curves. The displacement is, of course, the total weight, i. e. $W_0 + W_1 + W_2 \ldots$, where $W_0$ is the ship's light weight, $W_1$ the weight of the cargo on one deck, $W_2$ the weight of the cargo on another deck, etc.

$$KG = (W_0 h_0 + W_1 h_1 + W_2 h_2 \ldots) : \text{displacement},$$

where $h_0$ is the light weight center of gravity above the keel, $h_1$ the average level of the cargo on said one deck above the keel, $h_2$ the average level of the cargo on said second named deck above the keel, etc.

Each set of values for the independent variables $W_0$, $W_1$, $W_2$ ... determines one location of the point 78 in the described structure. By setting the actuators to all values of the independent variables, co-related by GM equals a certain value $GM_1$, a locus is obtained for the point 78. In the drawing, this line of position is designated by $GM_1$.

This locus generally will be a complicated curve. However, by proper arrangement it is possible to obtain a locus, within the required range of the independent variables, close to a circular arc. The means for influencing the shape of said locus include the relative location of the points at which all springs are connected to the core member and the points 72 and 78, and, additionally, the correlation between the strokes of the actuators and the corresponding values of the independent variables.

The circle of osculation is determined for locus $GM_1$, and its center 80 marked.

This procedure is repeated for a value $GM_2$ near one limit of the required range of GM. A locus $GM_2$ with center 82 is thus obtained.

This procedure is repeated again for a value near the other limit of the required range of GM. A locus $GM_3$ with the center 84 is thus obtained.

Generally, the radii will be different for the three loci obtained. By proper arrangement, however, particularly by the means mentioned in the fourth preceding paragraph, it is possible in most cases to obtain three loci of practically the same radius.

The center 86 of the circle passing through the points 80, 82, 84 is determined.

An indicator 88, for example in the form of a bellcrank lever, is hingedly connected to the housing 42 at the point 86, and to the core member 52 by a rigid link 90 connecting the points 78 and 80.

Where a rigid link is employed as at 90 to connect the hinge 78 of the core member to the hinge 80 on the indicator 88, its length is substantially equal to the mean radius of curvature of the loci $GM_1$, $GM_2$, $GM_3$, etc. described by said core member hinge for constant values of GM, the indicator being arranged to guide the hinge 80 in a path through the centers of osculation of said loci.

Thus one and the same position of the indicator 88 corresponds to all combinations of the independent variables belonging to one and the same value of the dependent variable GM, and a monodimensional scale 92 on the housing can be calibrated directly in terms of said dependent variable.

Figure 3:
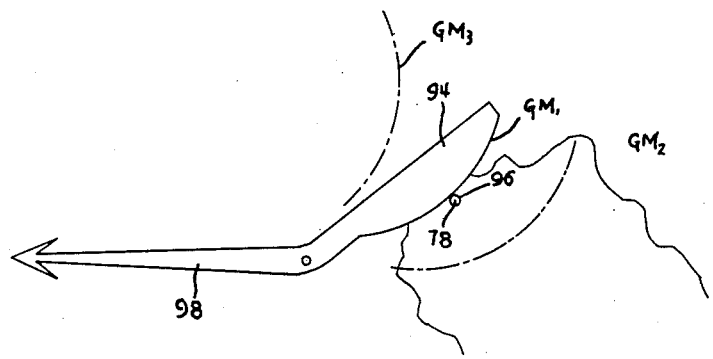
Fig. 3 is a detail of a variant of the Fig. 2 form of my invention, showing a cam instead of link means to actuate a reading member.

Instead of embodying the loci $GM_1$, $GM_2$, etc. by link means, they may be embodied by a cam and cam follower on the core member, the cam engaging the follower, as shown in Fig. 3. The cam 94 has a shape corresponding to the loci $GM_1$, $GM_2$, $GM_3$, etc. described by the follower 96 at the point 78 on the core member 52, and is connected to an indicator 98 hinged to the housing at the point 86 so that the cam can coincide substantially with all the loci $GM_1$, $GM_2$, $GM_3$, etc. as the indicator moves through its stroke.

Figure 4:
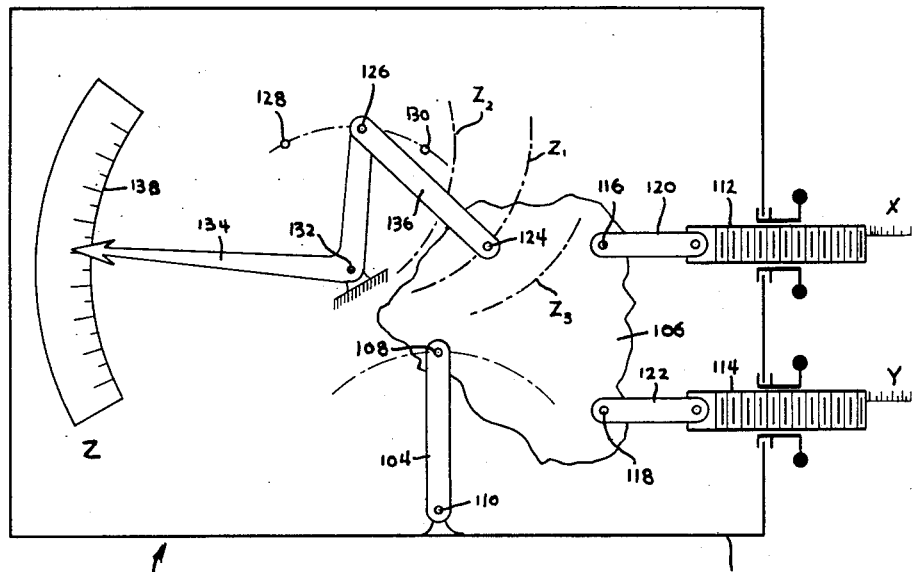
Fig. 4 is a schematic view of a computing apparatus embodying another modified form of my invention.

Pursuant to an ancillary phase of my invention, the springs may be replaced by rigid links, as shown in Fig. 4. The computer 100 illustrated in said figure will perform the calculation $Z = f(X, Y)$. Said computer comprises a housing 102 in which a link 104 is pivotally connected to a core member 106 at point 108 and to the housing at point 110. The link guides the core member so that the latter retains two degrees of freedom.

Two actuators 112, 114 of the micrometer screw type correspond to the variables X and Y respectively. Each actuator is connected to the core member at spaced points 116, 118 by rigid links 120, 122 which are substantially parallel to one another and to the direction of movement of the actuators.

A point 124 is selected on the core member which for varying values of X and Y corresponding to given values $Z_1$, $Z_2$, $Z_3$ ... of the dependent variable will trace out loci $Z_1$, $Z_2$, $Z_3$ ... which are congruent circular arcs having centers of osculation 126, 128 and 130, respectively, turning about a common center 132. The proper shape and arrangement of the loci are obtained by adjusting the relative position of the points 108, 116, 118 and 124, as well as the correlation between the stroke of the actuators 112, 114 and the corresponding values of the variables X and Y.

A bell-crank lever indicator 134 is pivoted to the housing at the point 132 and a rigid link 136 is pivotally connected to said lever at the point 126 and to the core member at the point 124. The length of the lever is substantially equal to the mean radius of curvature of the loci $Z_1$, $Z_2$, $Z_3$ ... described by the point 124 for constant values of Z. Said indicator reads against a scale 138 on the housing.

The present invention is a continuation-in-part of my copending application for Computing Apparatus, Serial No. 469,545, filed December 19, 1942, now forfeited.

It will thus be seen that there are provided devices in which the several objects of this invention are achieved, and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a computer for determining the value of a dependent variable which is a function of a plurality of independent variables, wherein each of the independent variables has a predetermined range of values: the combination of, a core member, means to hold the core member in floating suspension, said means comprising several opposed parallel helical springs spaced from one another in a direction perpendicular to the longitudinal axes of the springs, each of said springs having one end thereof attached to the core member, and means to vary the positions of the other ends of at least some of said springs in accordance with the values of the independent variables, whereby a change in the values of the independent variables causes said core member to change its equilibrium position and assume a definite new spatial position which is a measure of the new value of the changed dependent variable.

2. In a computer for determining the value of a dependent variable which is a function of a plurality of independent variables, wherein each of the independent variables has a predetermined range of values: the combination of, a core member, means to hold the core member in floating suspension, said means comprising several opposed parallel helical springs spaced from one another in a direction perpendicular to the longitudinal axes of the springs, each of said springs having one end thereof attached to the core member, means to vary the positions of the other ends of at least some of said springs in accordance with the values of the independent variables, whereby a change in the values of the independent variables causes said core member to change its equilibrium position and assume a definite new spatial position which is a measure of the new value of the changed dependent variable, and means controlled by the spatial position of the core member for indicating the value of the dependent variable.

3. In a computer for determining the value of a dependent variable which is a function of a plurality of independent variables, wherein each of the independent variables has a predetermined range of values: the combination of, a core member, means to hold the core member in floating suspension, said means comprising several opposed parallel helical springs spaced from one another in a direction perpendicular to the longitudinal axes of the springs, each of said springs having one end thereof attached to the core member, actuators to vary the positions of the other ends of at least some of said springs in accordance with the values of the independent variables, whereby a change in the values of the independent variables causes said core member to change its equilibrium position and assume a definite new spatial position which is a measure of the new value of the changed dependent variable, and means controlled by the spatial position of the core member for indicating the value of the dependent variable.

4. In a computer for determining the value of a dependent variable which is a function of a plurality of independent variables, wherein each of the independent variables has a predetermined range of values: the combination of, a core member, means to hold the core member in floating suspension, said means comprising several opposed parallel helical springs spaced from one another in a direction perpendicular to the longitudinal axes of the springs, each of said springs having one end thereof attached to the core member, a housing for said core member and springs and supporting the ends of said spring, actuators variably interconnecting the other ends of at least some of said springs to said housing in accordance with the values of the independent variables, whereby a change in the values of the independent variables causes said core member to change its equilibrium position and assume a definite new spatial position which is a measure of the new value of the dependent variable, and means controlled by the spatial position of the core member for indicating the value of the dependent variable.

5. In a computer for determining the value of a dependent variable which is a function of a plurality of independent variables of similar character, wherein each of the independent variables has a predetermined range of values: the combination of, a core member, means to hold the core member in floating suspension, said means comprising at least four opposed parallel helical springs spaced from one another in a direction perpendicular to the longitudinal axes of the springs, each of said springs having one end thereof attached to the core member, and means to vary the positions of the other ends of at least some of said springs in accordance with the values of the independent variables, whereby a change in the values of the independent variables causes said core member to change its equilibrium position and assume a definite new spatial position which is a measure of the new value of the changed dependent variable.

6. In a computer for determining the value of a dependent variable which is a function of a plurality of independent variables, wherein each of the independent variables has a predetermined range of values: the combination of, a core member, means to hold the core member in floating suspension, said means comprising several opposed parallel helical springs spaced from one another in a direction perpendicular to the longitudinal axes of the springs, each of said springs having one end thereof attached to the core member, means to vary the positions of the other ends of at least some of said springs in accordance with the values of the independent variables, whereby a change in the values of the independent variables causes said core member to change its equilibrium position and assume a definite new spatial position which is a measure of the new value of the changed dependent variable, a stationary member, a scale carried by said stationary member and graduated in terms of said dependent variable, and a linear marker carried by said core member and readable against said scale whereby the spatial position of said core member will indicate the value of the dependent variable.

7. A computer as set forth in claim 6 wherein there are at least two dependent variables which are functions of the same independent variables, and wherein two scales on the stationary member and two linear markers on the core member are provided so that each spatial position of the core member will indicate values for each of the dependent variables.

8. In a computer for determining the value of a dependent variable which is a function of a plurality of independent variables of similar character which are distinguished from one another by their individual magnitudes and spatial relationship, wherein each of the independent variables has a predetermined range of values: the combination of, a core member, means to hold the core member in floating suspension, said means comprising several opposed parallel helical springs spaced from one another in a direction perpendicular to the longitudinal axes of the springs by amounts which are related to the spacing between the independent variables, each of said springs having one end thereof attached to the core member, and means to vary the positions of the other ends of at least some of said springs in accordance with the values of the independent variables, whereby a change in the values of the independent variables causes said core member to change its equilibrium position and assume a definite new spatial position which is a measure of the new value of the changed dependent variable.

9. In a computer for determining the value of a dependent variable $y$ which is equal to $\Sigma(m_i W_i)$, $W_i$ being a plurality of independent variables of similar character, wherein each of the independent variables has a predetermined range of values: the combination of, a core member, means to hold the core member in floating suspension, said means comprising several opposed parallel helical springs spaced from one another in a direction perpendicular to the longitudinal axes of the springs, each of said springs having one end thereof attached to the core member, means to vary the positions of the other ends of at least some of said springs in accordance with the values of the independent variables, whereby a change in the values of the independent variables causes said core member to change its equilibrium position and assume a definite new spatial position which is a measure of the new value of the changed dependent variable, a stationary member, a scale carried by said stationary member and graduated in terms of said dependent variable, and a linear marker carried by said core member and readable against said scale whereby the spatial position of said core member will indicate the value of the dependent variable, the factors $m_i$ being equal to $$\frac{k_i}{\Sigma(k_i)} + \frac{k_i.a_i.x}{(k_i.a_i^2)}$$

wherein $k_i$ are the elastic rates of the springs, $a_i$ are the distances of the springs from a common reference point on the core member and $x$ is the location of a scale point along an axis perpendicular to the longitudinal axes of the springs, the numerators of the fractions for any given factor being the particular values associated with the spring corresponding to the independent value which the given factor multiplies.

10. A computer for determining the value of a dependent variable which is a function of a plurality of independent variables, wherein each of the dependent and independent variables has a predetermined range of values, said computer comprising a plurality of members spaced and parallel to each other, one for each of said independent variables, means to mount each of said members so that the position thereof can be set to correspond to a value of its associated variable within the predetermined range thereof, a core member, means to mount said core member for multi-dimensional movement, a plurality of means interconnecting each of said first named members to said core member in such manner that said core member will assume a definite position for each set of values of the independent variables and a certain point on said core member will describe curves of considerable lengths closely approximately congruent to each other within the range of values for the dependent variable, each of which curves is differently located and is the locus of said point for all sets of values of the independent variables corresponding to a different constant value of the dependent variable, and a movable member whose position is indicative of the value of the dependent variable, said member having associated therewith an element which in any position of the last named member corresponding to a certain value of the dependent variable mechanically defines a curve coincident with the locus of said point for the same value of the dependent variable, said point being kinematically interconnected with said element so as to be constantly coincident with the curve thereof, whereby said point, when travelling along one of its loci will not move said last named member and will move said member when it shifts from one to another of its loci.

11. A computer for determining the value of a dependent variable which is a function of a plurality of independent variables, wherein each of the dependent and independent variables has a predetermined range of values, said computer comprising a movable member whose position is indicative of the value of the dependent variable, said member having associated therewith an element which in all positions of said member mechanically defines a line, means to guide said element so that said line moves in a definite manner upon changes in value indicated by said member and is located in a certain different position for every different value of the dependent variable, a plurality of spaced members, one for each of said independent variables, means to mount each of said last named members so that the position thereof can be set to correspond to a value of its associated variable within the predetermined range thereof, a core member, means to mount said core member for multi-dimensional movement, a plurality of spring means interconnecting each of said plurality of members and said core member in such a manner that said core member will assume a definite position for each set of values of the independent variables and a certain point on said core member will describe loci of considerable lengths closely approximately congruent to each other within the range of values for the dependnent variable, each of which loci is the locus of said point for all sets of values of the independent variables, corresponding to a different constant value of the dependent variable, each locus for a certain value of the dependent variable being substantially coincident with said line in the position in which the same is located for the identical value of the dependent variable, said point being kinematically interconnected with said element so as to be constantly coincident with the line defined thereby, whereby said point when travelling along one of its loci will not move the indicating member and will move said member when it shifts from one to another of its loci.

JOHN KREITNER.

REFERENCES CITED

The following references are of record in the file of this patent:

UNITED STATES PATENTS

| Number | Name | Date |
|---|---|---|
| 1,481,248 | Sperry | Jan. 15, 1924 |
| 2,114,185 | Havourd et al. | Apr. 12, 1938 |
| 2,179,822 | Imm | Nov. 14, 1939 |
| 2,185,633 | Horsley | Jan. 2, 1940 |
| 2,203,674 | Dashefsky | June 11, 1940 |
| 2,391,243 | Hutton | Dec. 18, 1945 |
| 2,393,162 | Hayes | Jan. 15, 1946 |

FOREIGN PATENTS

| Number | Country | Date |
|---|---|---|
| 144,893 | Switzerland | May 16, 1931 |
| 408,803 | Great Britain | Apr. 19, 1934 |
| 548,093 | Great Britain | Sept. 24, 1942 |
| 650,084 | France | Jan. 4, 1929 |